(No Model.)

R. L. FAIRCHILD.
KITCHEN SINK.

No. 433,650. Patented Aug. 5, 1890.

Witnesses.
Arthur J. Sangster.
Harriet Johnson.

Rebecca L. Fairchild. Inventor.
By James Sangster
Attorney.

THE NORRIS PETERS CO., PHOTO-LITHO., WASHINGTON, D. C.

UNITED STATES PATENT OFFICE.

REBECCA L. FAIRCHILD, OF BUFFALO, NEW YORK.

KITCHEN-SINK.

SPECIFICATION forming part of Letters Patent No. 433,650, dated August 5, 1890.

Application filed February 8, 1890. Serial No. 339,657. (No model.)

*To all whom it may concern:*

Be it known that I, REBECCA L. FAIRCHILD, a citizen of the United States, residing at Buffalo, in the county of Erie and State of New York, have invented certain new and useful Improvements in Kitchen-Sinks, of which the following is a specification.

The object of my invention is to combine with a kitchen-sink a removable strainer whereby the solid particles of refuse matter usually thrown into a sink are retained in the strainer, and a convenient means is thereby provided for removing the solid particles of refuse matter and throwing them into a garbage-receptacle, all of which will be fully and clearly hereinafter described and claimed, reference being had to the accompanying drawings, in which—

Figure 1:
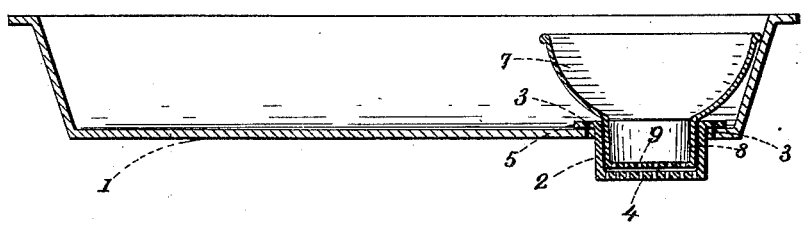
Figure 2:
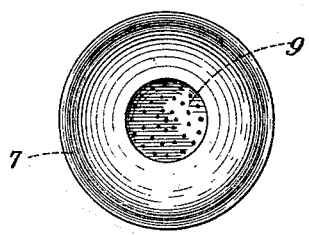
Figure 3:
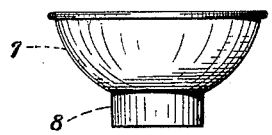
Figure 4:
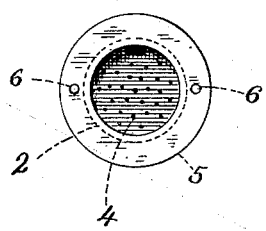
Figure 5:

Figure 1 represents a vertical longitudinal central section through a sink and the removable strainer, cutting also through the socket-strainer, which is attached to and forms a portion of the sink and is adapted to receive and securely hold the removable strainer. Fig. 2 is a top view of the removable strainer. Fig. 3 is a side elevation of the same. Fig. 4 is a top view of the socket-strainer, and Fig. 5 is a side elevation of Fig. 4.

In said drawings, 1 represents an ordinary sink, which may be made of cast-iron or any well-known material adapted for the purpose, and of any suitable shape or size. Into the usual opening through a sink to receive an ordinary strainer I put a socket-strainer 2 and secure it in place by screws 3. This socket portion is provided with a series of small perforations 4 in the bottom, which act as the usual sink-strainer. The inside of this receptacle is preferably made a little tapering, but may be straight, if desired, and at the top is a surrounding flange 5, which supports it, and is provided with holes 6, through which the screws 3 pass and are screwed into the bottom of the sink. The removable strainer 7 I have shown in the form of an ordinary wash-basin having a downward-projecting portion 8, provided with a perforated strainer portion 9 at the bottom. This lower projecting portion 8 is formed so as to fit nicely in the socket-strainer 2, so that when in place therein, substantially as shown in Fig. 1, it cannot be accidentally tipped over or easily moved out of place unless required. The form of the upper portion of the removable strainer may be varied so as to adapt it for the different kinds of sinks in use.

The socket-strainer is adapted to be easily fitted to any ordinary sink by removing the usual strainer and securing it in its position in the manner shown in Fig. 1.

The operation of the device is simple and easily understood. The liquid and solid refuse matter being thrown into the removable strainer 7, the liquid passes through the strainer into the sink, while the solid matter is retained, and the removable strainer may then easily be removed and the solid matter thrown into a suitable garbage-receptacle. By this means the sink is kept clean and unobstructed.

The object in combining the cylindrical portion 8 of the strainer with a larger flaring bowl 7 is to provide a convenient means to receive the liquid and solid refuse matter and to prevent them from getting into or scattering the objectionable matter over the bottom of the sink, and thereby considerably lessen the labor required to keep it clean.

I am aware that removable strainers have heretofore been used in kitchen-sinks; but such strainers have not been protected with a bowl attachment 7, thereby leaving the sink as much unprotected from the refuse matter as if the strainer were not removable. I therefore do not claim such construction, broadly; but What I do claim is—

The combination, with a kitchen-sink, of a socket-strainer 2, secured thereto, and a removable strainer consisting of the lower downward-projecting cylindrical portion 8, flaring bowl-shaped portion 7, and perforated bottom 9, the whole combined and arranged as and for the purposes described.

REBECCA L. FAIRCHILD.

Witnesses:
JAMES SANGSTER,
CORA J. BLAKELEY.